United States Patent [19]
Farrell et al.

[11] Patent Number: 5,343,483
[45] Date of Patent: Aug. 30, 1994

[54] HIGH VOLTAGE FAST PULSE CONTROL FOR A Q-SWITCHED LASER

[75] Inventors: Patrick V. Farrell, Madison, Wis.; Janghee Lee, Seoul, Rep. of Korea; Andrew B. Beal, Madison, Wis.

[73] Assignee: Wisconsin Alumni Research Foundation, Madison, Wis.

[21] Appl. No.: 34,855

[22] Filed: Mar. 19, 1993

[51] Int. Cl.$^5$ ............................................... H01S 3/11
[52] U.S. Cl. ........................................ 372/10; 372/12; 372/25; 372/38
[58] Field of Search ................. 372/10, 17, 38, 12, 372/25

[56] References Cited

U.S. PATENT DOCUMENTS

| | | | |
|---|---|---|---|
| 3,571,744 | 3/1971 | Hook et al. | 372/10 |
| 3,577,097 | 5/1971 | Hilberg | 356/28.5 |
| 3,673,504 | 6/1972 | Hilberg | 372/12 |
| 3,694,769 | 9/1972 | Hook et al. | 372/38 |
| 3,783,403 | 1/1974 | Hook et al. | 372/10 |
| 4,483,614 | 11/1984 | Rogers | 372/12 |
| 4,552,455 | 11/1985 | Johansson et al. | 372/70 X |
| 4,675,872 | 6/1987 | Popek et al. | 372/12 |
| 4,896,119 | 1/1990 | Williamson et al. | 372/18 X |
| 5,016,251 | 5/1991 | D'Arcy | 372/10 |

FOREIGN PATENT DOCUMENTS 2-209780 8/1990 Japan.

OTHER PUBLICATIONS

"Driving Method for Q-switching Laser Device", Patent Abstract of Japan, 58-79788, Watabe, May 1983.

Primary Examiner—John D. Lee
Assistant Examiner—Hemang Sanghavi
Attorney, Agent, or Firm—Foley & Lardner

[57] ABSTRACT

A laser system having a laser rod, flash lamp, and a Q-switch including an electro-optical cell, is operated to provide double laser output pulses closely spaced from each other, e.g., within 5 microseconds. Two Q-switch drivers are provided with independent high voltage power supplies which can provide different high voltages to the two Q-switches. The outputs of the Q-switches are provided to an interface circuit which includes back-to-back diodes connected to a node which is connected to the output provided to the electro-optical cell. A control signal is provided to the first Q-switch driver after the flash lamp has been fired to provide a first pulse to the electro-optical cell to provide a pulse of light from the laser. A selected period of time thereafter, a control signal is provided to the second Q-switch driver to provide an output pulse through the interface circuit to the electro-optical cell to provide the second light pulse from the laser. The interface circuit prevents voltage pulses from one Q-switch driver to be conducted to the other Q-switch driver. Substantially equal output light pulses may be obtained from the laser by adjusting the voltage level of the high voltages applied to the two Q-switch drivers.

14 Claims, 4 Drawing Sheets

HIGH VOLTAGE FAST PULSE CONTROL FOR A Q-SWITCHED LASER

This invention was made with United States Government support awarded by the U.S. Army Research Office (ARO), Grant No. DAAL03-86-K-0174. The United States Government has certain rights in this invention.

FIELD OF THE INVENTION

This invention relates to lasers and particularly to lasers which can provide two pulses of laser light in rapid succession. More particularly, this invention relates to an improved Q-switched laser for producing two or more closely spaced laser pulses from a single laser.

BACKGROUND OF THE INVENTION

Lasers are used in various testing and research operations. For example, lasers may be used as light sources in the photographic recording of flow fields, such as in internal combustion engines, wind chambers, heating and cooling system ducts, or other applications where fluid flow is of interest. In these applications, a laser system may provide a double pulse of laser light for illumination to allow photographic recording of rapid fluid flow in the particular device. These applications often require two pulses of light within 5 to 60 microseconds of each other. Heretofore, two lasers were typically used in a laser system to provide pulses in such rapid succession. However, these systems are relatively expensive because two lasers are needed.

To provide background, the principles of operation of an exemplary laser, e.g., a Nd:YAG laser, may be described as follows. The laser is generally comprised of flash lamps, laser rods, mirrors for reflecting laser light from the rods, and a Q-switch which enables the storage of energy in and dumping of energy out of the laser rods. The Q-switch is typically comprised of a Pockels cell, a Glan-Taylor polarizer prism and a Q-switch driver circuit. A capacitor bank is charged by a high voltage power supply to store energy for the flash lamp.

When a fire signal or triggering signal is provided to the laser, a capacitor bank discharges power through the flash lamps and ionizes the flash lamps. The light energy from the flash lamps pump Neodymium (Nd) atoms in the oscillator and amplifier rods to higher energy levels. The Q-switch driver circuit then triggers the Pockels cell by providing a high voltage signal. The Pockels cell changes its polarization angle in response to the high voltage signal to allow passage of photons to allow lasing to occur. The Neodymium atoms emit photons coherently as they fall back to a lower energy level.

Generally, the Q-switch driver circuit is unable to provide high voltage pulses to the Pockels cell in extremely rapid succession, at the rate required for very fast photography, due to constraints such as the time required to charge capacitors in the Q-switch driver circuit.

U.S. Pat. No. 3,783,403, issued to Hook et al. on Jan. 1, 1974, describes a laser system for producing double pulses from a single laser. The system utilizes two flash lamp trigger circuits and a Q-switch driver circuit including two pulse inputs to a high voltage pulse transformer. The circuit provides two laser pulses with variable pulse intervals ranging from 80 microseconds to 2,000 microseconds.

SUMMARY OF THE INVENTION

In accordance with the present invention, double laser light pulses are produced from a single laser by turning a single Pockels cell ON and OFF in rapid succession during a single flash lamp excitation of the laser. The present invention provides a Q-switch control circuit for operation with a laser light source including a Pockels cell and a flash lamp. The Q-switch circuit includes a first Q-switch driver circuit coupled to a first high voltage power supply and a second Q-switch driver circuit coupled to a second high voltage power supply. After the flashlamp is fired, the first Q-switch driver circuit turns ON the Pockels cell by providing energy to the Pockels cell in a pulse of selected duration and magnitude. The second Q-switch driver circuit turns ON the Pockels cell a selected period of time later by providing energy in a second pulse of selected duration and magnitude. Very short, closely spaced pulses may be provided utilizing the invention, for example, pulses having about 3 nanoseconds rise and fall times and 6–10 nanoseconds "on" times, with spacing between pulses selectable down to 2 to 5 microseconds, or less if desired. Such short and closely spaced pulses may be obtained in the Q-switch circuit of the present invention since a transformer or other inductor is not required in the output circuit. Pulses of the duration and spacing provided by the Q-switch control circuit are well suited for use with Nd:YAG lasers, and allow fast double pulsing for photographic applications.

The present invention also provides an advantageous interface circuit for allowing two Q-switch driver circuits to be coupled to a single Pockels cell. The interface circuit isolates the Q-switch driver circuits from each other to allow the capacitors in each Q-switch driver circuit to be charged independently of the other, as well as preventing the firing of one Q-switch driver circuit from affecting the other driver circuit.

Further objects, features and advantages will be apparent from the following detailed description when taken in conjunction with the accompanying drawings.

DETAILED DESCRIPTION OF THE INVENTION

Figure 1:
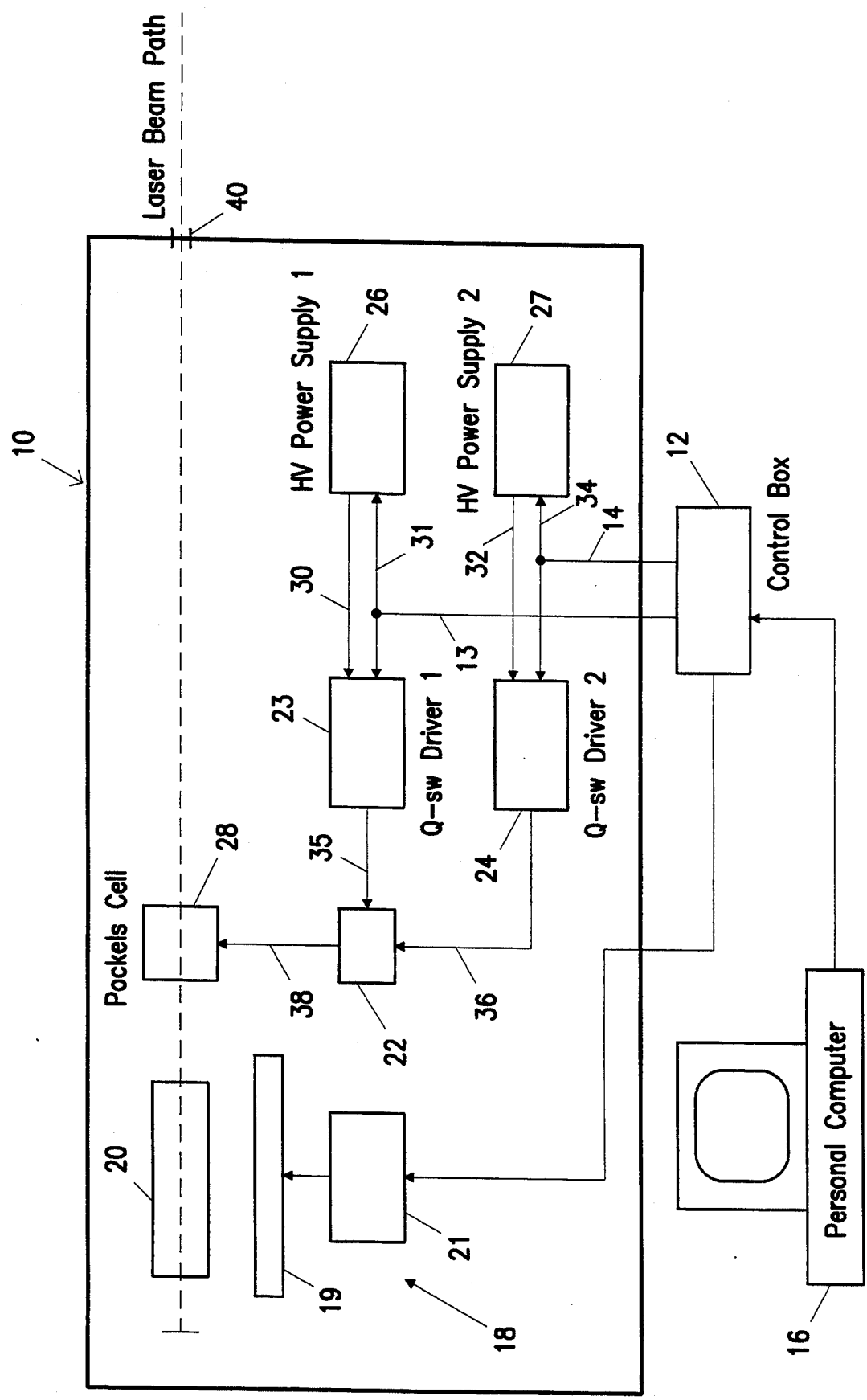
FIG. 1 is a block diagram of an exemplary laser system in accordance with the present invention.

To illustrate the use of the present invention, a laser system is shown generally at 10 in FIG. 1 coupled to a control box 12 by first trigger input lines 13 and second trigger input lines 14. The control box 12 is connected to a personal computer 16 which provides, in accordance with software selected by the user, various control signals and timing sequences to the control box 12 for controlling the laser system 10. The laser system 10 has a laser light source 18 for producing laser light with a flashlamp(s) 19, a laser rod(s) 20, and a capacitor bank and high voltage supply 21 for the flash lamp. The laser light source 18 may be any of various types of laser light generators, such as those using gas lasers, Nd:YAG lasers, ruby lasers, and so forth.

The laser system 10 also includes a Q-switch which is composed of an interface circuit 22, a first Q-switch driver circuit 23, a second Q-switch driver circuit 24, a first high voltage power supply 26, a second high voltage power supply 27, and an electro-optical control cell 28 such as a Pockels cell. Other conventional laser components such as a Glan-Taylor prism, mirrors, etc., are not shown in FIG. 1 for simplicity of illustration, it being understood that such parts are standard and any desired configuration may be utilized. It is also understood that the laser light source may include more than one rod and flash lamp. The high voltage power supply 26 is coupled to the first Q-switch driver circuit 23 via a high voltage line 30 and a trigger input line 31. The high voltage power supply 27 is coupled to the Q-switch driver circuit 24 via a high voltage line 32 and a trigger input line 34. An output line 35 of the Q-switch driver circuit 23 is coupled to a first input of the interface circuit 22, and an output line 36 of the Q-switch driver circuit 24 is coupled to a second input of the interface circuit 22. An output line 38 of the interface circuit 22 is connected to an input of the Pockels cell 28.

The Pockels cell 28 is controlled by the voltage signal on the output line 38. When a high voltage pulse is provided on the output line 38, the Pockels cell 28 allows the laser light from the rod 20 to pass out of the laser system 10 at an output opening 40. The interface circuit 22 allows the Q-switch driver circuits 23 and 24 to be coupled to the Pockels cell 28 without interfering with each other during charging and firing of the Q-drivers, as explained further below. When the high voltage signal at the output line 38 is absent, the Pockels cell 28 does not allow light to pass to the output 40.

The high voltage power supplies 26 and 27 may each be standard laser high voltage power supplies, for example, the high voltage power supply in the model YG580 laser manufactured by Quantel International (now Continuum Corp.). Also, the Pockels cell 28 and laser light source 18 further may be standard components, and may be, for example, similar to the Pockels cell and laser light source employed in the YG580 laser. The individual Q-switch driver circuits 23 and 24 may also each be conventional driver circuits similar to the Q-switch driver circuit employed in the YG580 laser.

In operation, the laser 10 utilizing the present invention can provide two pulses in very rapid succession. Upon a signal from the computer 16 and the control box 12, the laser light source 18 provides laser light by discharging the capacitors in the supply 21 to fire the flash lamp 19. The Pockels cell 28 initially prevents laser light from being emitted at the output 40. In response to a triggering signal at the first triggering input 13, while the laser rod is energized by the flash lamp, the Q-switch driver 23 provides a high voltage signal (a pulse) to the interface circuit 22 on its output line 35. The interface circuit passes the high voltage pulse signal on its output line 38 to the Pockels cell 28 to allow the laser light to pass to the output 40. Within a short period of time (e.g., 5-60 microseconds), and while the laser rod is still energized, a triggering signal is provided at the second triggering input 34 to the second Q-switch driver circuit 24. The Q-switch driver circuit 24 provides a high voltage pulse signal at its output 36 to the interface circuit 22. The interface circuit passes the high voltage signal to the Pockels cell 28 to turn it ON and allow the laser light to pass to the laser output 40. The laser system thus provides two pulses of laser light at the output 40 in rapid succession. The laser is able to provide two pulses in rapid succession because the Q-switch driver circuits 23 and 24 are able to fire independently, and the Q-switch driver circuits and high voltage power supplies 26 and 27 do not have to recover rapidly from a previous firing.

Figure 2:
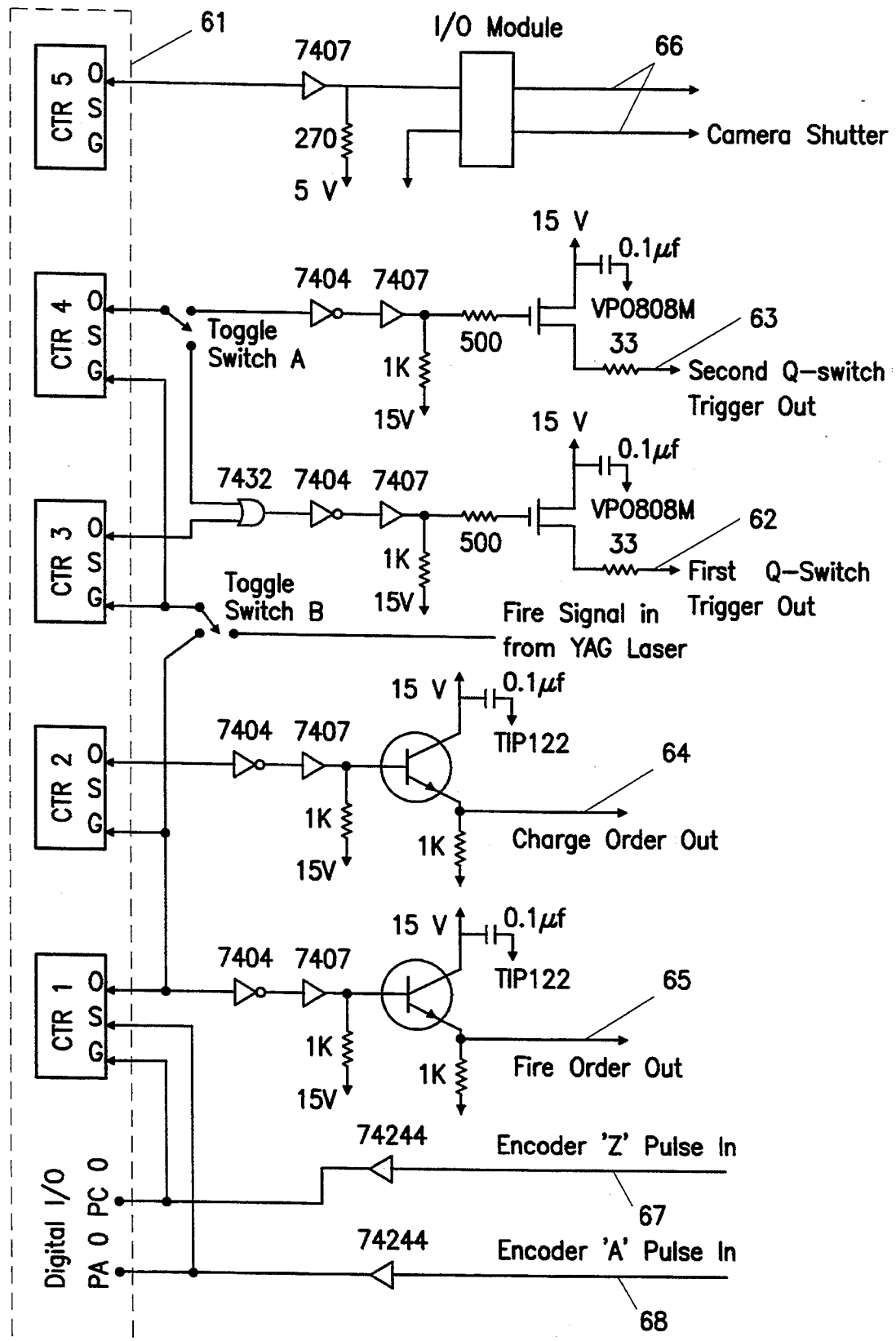
FIG. 2 is a detailed schematic of an exemplary control box for use with the laser.

With reference to FIG. 2, a schematic of the control box 12 in conjunction with the computer 16 is shown for an exemplary application, the recording of flow fields in an internal combustion (e.g., diesel) engine. The computer 16 includes a timer/counter 61 which provides several counter outputs to the control box. The circuitry in the control box provides a first trigger output 62 for coupling to the first trigger input 13, a second trigger output 63 for coupling to the second trigger input 14, a charge output 64, a fire output 65, and camera outputs 66. An index "Z" pulse input 67 and an "A" pulse input 68 are provided to the computer. The index pulse input 67 is provided from a shaft encoder (not shown) which is attached to the valve driving camshaft in the diesel engine. The index input 67 provides a pulse once per revolution of the shaft, and the A pulse input, also provided from a shaft encoder, receives a pulse 1800 times per camshaft revolution, giving a resolution of 0.2 degrees of revolution.

The timer/counter 61 within the computer 16 may be a combined timer, counter and digital I/O interface board, such as model TC24 manufactured by Realtime Devices, Inc. which utilizes an AM9513A timing controller chip containing five general purpose 16 bit counters operating at up to 5 megahertz. The AM9513A is manufactured by Advanced Micro Devices.

The charge output 64 provides a signal to the laser system 10 which charges the capacitor bank in the supply 21 associated with the flash lamp 19, and the fire output 65 provides a firing or triggering signal to discharge the capacitor bank and fire the flash lamp 19. The flash lamp energizes the laser rod 20 to provide laser light in response to the firing signal. The camera outputs 66 control a camera shutter (not shown) for photographically recording the flow fields. Thus, the control box 12 provides control signals for controlling the camera at the camera outputs 66 and the Q-switch driver circuits 23 and 24 at the trigger outputs 62 and 63, for charging the capacitor bank associated with the flash lamp 19 at the output 64, and for firing the flash lamp at the output 65. As noted above, the computer and control box produce these signals in response to signals from a shaft encoder (not shown) attached to the diesel engine (not shown) at inputs 67 and 68.

Figure 3:
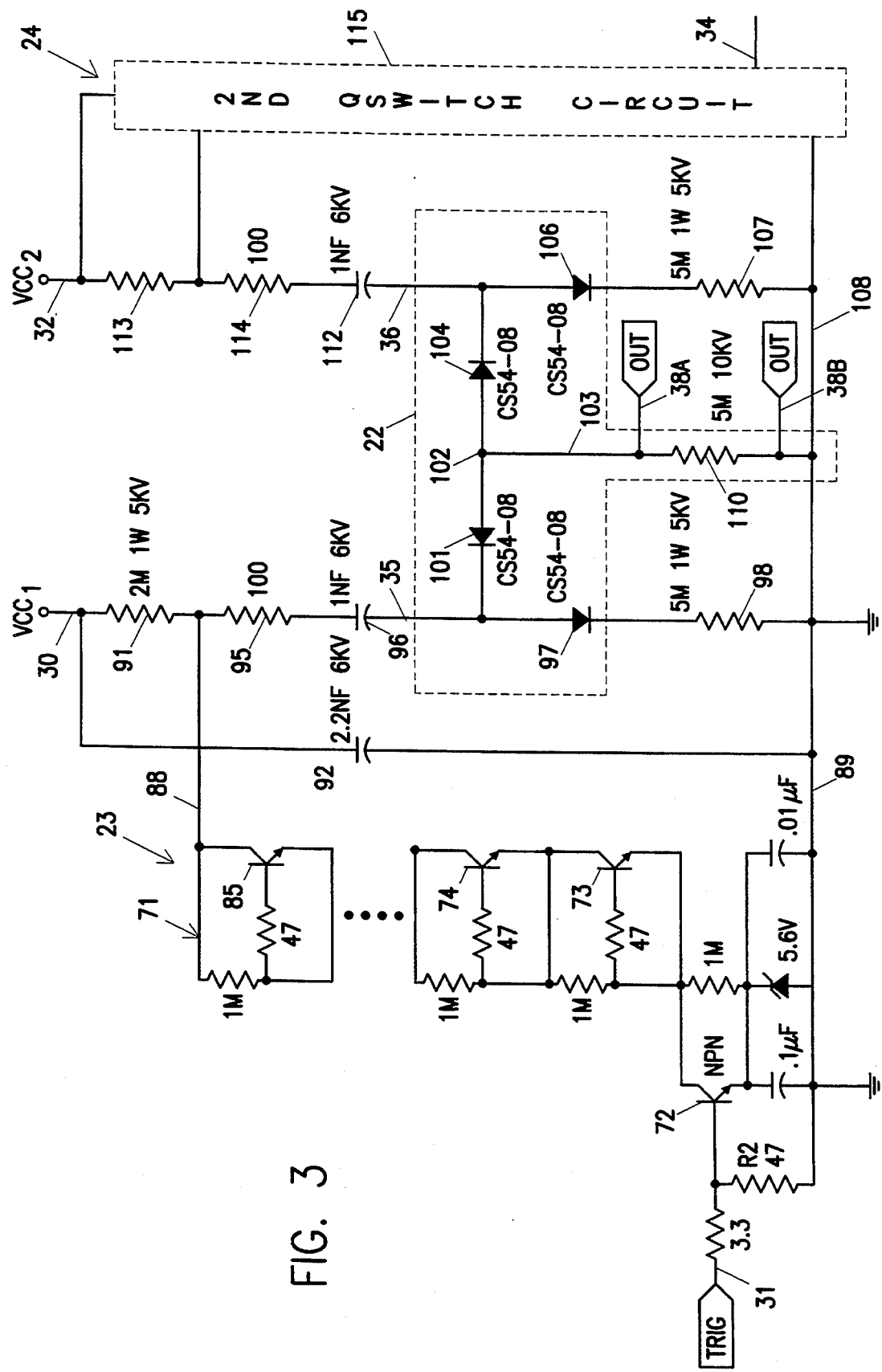
FIG. 3 is a detailed schematic of an exemplary Q-switch driver and interface circuit in accordance with the invention.

A more detailed schematic of the Q-switch driver circuits 23 and 24 and the interface circuit 22 is shown in FIG. 3. The Q-switch driver circuit 24 is essentially identical to the Q-switch driver circuit 23 and is not shown in full in FIG. 3 for simplicity of illustration. Each Q-switch driver circuit preferably incorporates a Q-switch driver avalanche switch 71 of standard design. The Q-switch driver circuit 23 receives a high voltage from the high voltage power source 26 on the high voltage line 30.

The avalanche switch 71 is comprised of several (e.g., fourteen) bipolar transistors 72 through 85 (only transistors 72, 73 and 85 are shown for clarity of illustration) connected in an avalanche configuration with appropriate biasing and connecting resistors. The switch 71 is connected across lines 88 and 89, with the line 89 being grounded. The high voltage from the input line 30 is connected through a resistor 91 (e.g., 2M ohms) to the line 88. A capacitor 92 is connected between the input line 30 and the ground line 89, and thus charges up to the voltage on the line 30. A small value resistor 95 (e.g., 100 ohms), a capacitor 96 (e.g., one nanofarad), a diode 97, and a large value resistor 98 (e.g., 5M ohms) are connected in series between a connection to the line 88 and the ground line 89.

The diode 97 forms part of the interface circuit 22. That circuit also includes a diode 101 connected between a node 102 and the line 35 (which connects the capacitor 96 and the diode 97). The interface circuit also includes a diode 104 connected between the node 102 and the second input line 36, and a diode 106 and resistor 107 connected in series from the line 36 to a ground line 108. An output line 103 extends from the node 103 to a large valued resistor 110 (e.g., 5M ohms) which is connected to the ground line 108. The output voltage is provided across the resistor 110 on two output lines 38A and 38B which extend to the Pockels cell 28. It is understood that the configuration of the Q-switch driver 23 shown in FIG. 3 is conventional with the interface circuit 22 allowing two (or more) such conventional drivers to be connected together. If desired, the diodes 101 and 104 may be replaced by transistors of appropriate polarity which can be controlled by a timing circuit (not shown) to allow even closer control of the width and shape of the pulses. As used herein, the term "diodes" will be understood to include such transistors.

When the switch 71 is open, the high voltage from the line 30 causes a current to pass through the resistors 91 and 95, the capacitor 96, the diode 97 and the resistor 98 to charge the capacitor 96 to the value of the voltage on the line 30. The diode 101 prevents this voltage from being applied to the node 102. When a trigger signal is applied from the line 31 to the base of the transistor 72 (e.g., about 15 v), that transistor conducts, causing all the other transistors 73–85 in the switch 71 to conduct and essentially short the series resistor 95, capacitor 96, diode 97 and resistor 98. The diode 97 is now reverse biased so current cannot flow through it, and the capacitor 96 discharges through the switch 71, applying a negative voltage pulse through the diode 101 to the node 102 and thus applying a voltage pulse between the lines 38A and 38B. The pulse width is determined by the time constant for discharge of the capacitor 96. The diode 97 thus allows charging of the capacitor 96 through the diode while forcing discharge of the capacitor through the interface circuit and across the output lines 38A and 38B.

Because the voltage applied to the node 102 is negative, the diode 104 is back biased and no voltage is applied to the output line 36 of the second driver circuit 24. Similiarly, when the second driver circuit 24 is activated, and applies a negative pulse from a capacitor 12 through the diode 104 to the node 102, the diode 101 is back biased so no voltage is applied to the output line 35 of the first driver circuit 23. The second driver circuit 24 is similar to the first driver 23, and charges the capacitor 112 through series resistors 113 and 114 and through the diode 106 and the resistor 107. An avalanche switch 115 has the same configuration as the switch 71 and is triggered into conduction by a trigger signal on the line 34.

The computer 16 and the control box 12 determine the timing of application of the trigger signals on the lines 31 and 34 so that any desired spacing may be obtained between the voltage pulses applied to the Pockels cells. Preferably, the activation signals on the lines 31 and 34 should not be so closely spaced that pulses from the two driver circuits overlap each other.

Figure 4:
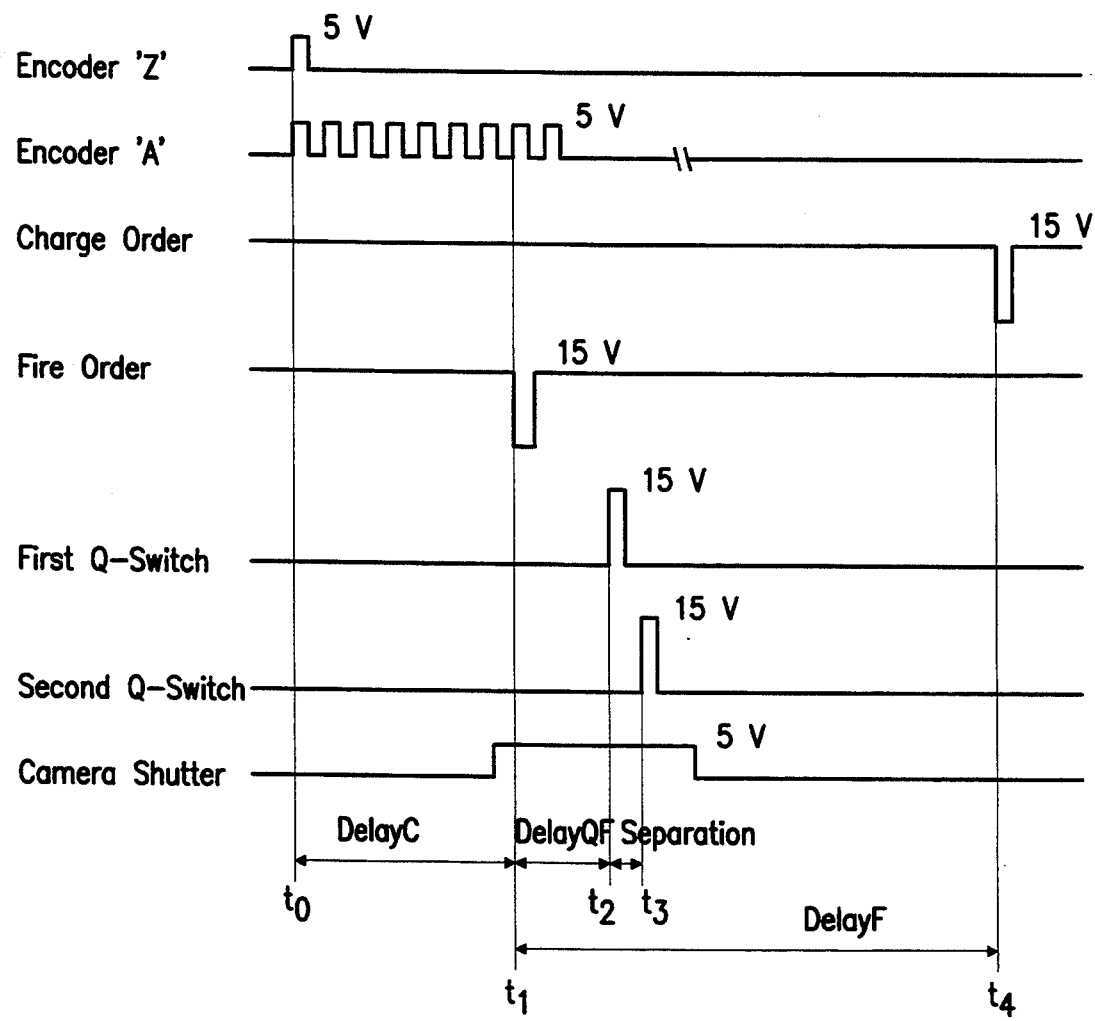
FIG. 4 is a timing diagram illustrating the operation of a laser in accordance with the invention in an exemplary analysis of an internal combustion engine.

With reference to the timing diagram in FIG. 4, the operation of the laser system 10 in an application which measures fluid flow in a diesel engine is illustrated. The timer counter 61 (see FIG. 2) receives the encoder Z signal at the index input 67 and the A signal at the input 68 from the shaft encoder (not shown) coupled to the diesel motor. At time $t_0$, the shaft encoder provides a pulse at the index input 67 indicating that the cam shaft is beginning a new revolution. The timer counter 61 counts pulses at the input 68 until a desired number of pulses has been counted. In this example, the desired number of pulses is eight.

At a time before time $t_1$, the control box 12 provides a signal at the camera outputs 66 to open the camera shutter (not shown). At time $t_1$, the counter has counted eight pulses at the input 68 and provides a firing or triggering signal at the output 65. In response to the signal at the output 65, the capacitor bank 21 associated with the flash lamp 19 discharges power through the flash lamp. In response, the laser rod 20 is energized to produce laser light.

At time $t_2$, the timer counter 61 generates a first Q-switch trigger signal which is provided at the output 62. The first Q-switch triggering signal is provided on the line 31 and turns the transistor 72 in the first Q-switch driver circuit ON to turn on the rest of the transistor in the avalanche switch 71 to provide the first pulse to the Pockels cell, as described above. When the triggering signal at the input line 31 is removed, the transistor 72 is turned OFF and the rest of the avalanche transistors 73–85 are turned OFF. The capacitor 96 is recharged through the resistors 91, 95, the diode 97 and the resistor 98.

At a time $t_3$, while the laser rod is still energized from the flash lamp pulse, the timer counter 61 generates a second triggering signal which is provided at the output 63. The second triggering signal is provided to the input line 34 of the second Q-switch driver 24 to turn on the avalanche switch 115. Circuit components identical to those inside the first Q-switch driver circuit 23 provide a high voltage pulse at the output line 36 to the interface circuit 22. The Pockels cell 28 is turned ON in response to the high voltage at the output lines 38A and 38B. After the second triggering pulse ends, the capacitor 112 is charged through the resistors 113 and 114, the diode 106 and the resistor 107. A selected time after the second Q-switch driver is turned OFF, the control box 12 provides a signal at the camera shutter output 66 to close the camera shutter. At time $t_4$, the capacitor bank associated with the flash lamps receives a charge order signal at the charge order output 64.

Delay C in FIG. 4 indicates the number of A pulses after the index pulse before the fire order is initiated by the timer/counter 61. Delay F is the time delay from the fire order signal to the charge signal. The delay QF is the time delay from the fire order to the first Q-switch triggering pulse, and Separation is the time between the first and second Q-switch driver pulses. Separation times as low as 2 microseconds (or lower) may be readily achieved with the present invention.

By utilizing two separate Q-switch drivers without requiring inductive couping to the output, very fast and short Q-switch pulses may be obtained. The rise and fall times for each Q-switch pulse is typically about 3 nanoseconds, with a typical "on" time for each pulse of from 6 to 10 nanoseconds.

In normal single pulse operation the high voltage power supply 26 would generally be set to −3.6 Kv to −4.0 Kv. However, in applications requiring double pulse operation, the high voltage power supply 26 should preferably be set to a first, lesser value, e.g., −1.7 Kv, and the high voltage power supply 27 should be set to a second, higher value, e.g., −4.0 Kv. By using a lower voltage level for the high voltage power supply 26, only a portion of the excitation energy in the laser provided from a single flash lamp pulse is spent for the first laser pulse, leaving energy for the second laser pulse. In this manner, the energy output from the laser for each pulse may be equalized.

It is understood that the invention is not confined to the particular construction or arrangement of parts described herein, but embraces such modified forms thereof as come within the scope of the following claims. Also, the drawings show preferred exemplary embodiments of the present invention wherein single lines may indicate plural conductors.

What is claimed is:

1. A Q-switched laser system comprising:
  (a) a laser light source including a laser rod, flash lamp, flash lamp power supply, and a Q-switch including an electro-optical cell for controlling the release of light from the laser in response to a voltage signal;
  (b) first Q-switch driver means for producing an output voltage pulse in response to a control signal for operating the electro-optical cell of the Q-switch, and a high voltage power supply for providing a high voltage to the first Q-switch driver means;
  (c) second Q-switch driver means for providing an output voltage pulse in response to a control signal for operating the electro-optical cell of the Q-switch, and a second high voltage power supply providing a high voltage to the second Q-switch driver means;
  (d) an interface circuit connected to receive the outputs of the first and second Q-switch driver means and connected to provide its output to the electro-optical cell, the interface circuit including means for passing an output voltage pulse from either one of the Q-switch driver means to its output while isolating the other Q-switch driver means from the voltage provided to the electro-optical cell;
  (e) control means for controlling the first and second Q-switch driver means and the flash lamp power supply to provide a control signal to the flash lamp power supply to fire the flash lamp, then providing a control signal to the first Q-switch driver means to cause it to provide an output pulse, and thereafter supplying a control signal to the second Q-switch driver means to cause it to provide an output pulse a selected period of time after the output pulse from the first Q-switch driver means.

2. The laser system of claim 1 wherein the control means provides the control signal to the second Q-switch driver means a period of time less than 60 microseconds from the time when the control means provided the control signal to the first Q-switch driver means.

3. The laser system of claim 1 wherein each Q-switch driver means includes an avalanche switch comprising a plurality of transistors connected in an avalanche configuration, and wherein the input signal is provided to a first of the transistors which conducts to drive each of the other transistors in the avalanche switch into conduction.

4. The laser system of claim 1 wherein the electro-optical cell is a Pockels cell.

5. The laser system of claim 1 wherein the first and second high voltage power supplies are independent and can be adjusted to provide differing output voltages to the first and second Q-switch driver means, and wherein the high voltage power supply for the first Q-switch driver means applies a lower voltage thereto than the voltage provided from the second high voltage power supply to the second Q-switch driver means.

6. The laser system of claim 1 wherein the control means provides the control signal to the second Q-switch driver means 2 to 5 microseconds from the time when the control means provided the control signal to the first Q-switch driver means.

7. A Q-switched laser system comprising:
  (a) a laser light source including a laser rod, flash lamp, flash lamp power supply, and a Q-switch including an electro-optical cell for controlling the release of light from the laser in response to a voltage signal;
  (b) first Q-switch driver means for producing an output voltage pulse in response to a control signal for operating the electro-optical cell of the Q-switch, and a high voltage power supply for providing a high voltage to the first Q-switch driver means;
  (c) second Q-switch driver means for providing an output voltage pulse in response to a control signal for operating the electro-optical cell of the Q-switch, and a second high voltage power supply providing a high voltage to the second Q-switch driver means;
  (d) an interface circuit connected to receive the outputs of the first and second Q-switch driver means and connected to provide its output to the electro-optical cell, the interface circuit including means for passing an output voltage pulse from either one of the Q-switch driver means to its output while isolating the other Q-switch driver means from the voltage provided to the electro-optical cell, wherein the means includes two diodes connected in back-to-back relation at a node, the node connected by a resistor to a ground line, one diode also connected to the output of the first Q-switch driver means and the other diode connected to the output of the second Q-switch driver means, and wherein the output of the interface circuit to the electro-optical cell is provided across the resistor connected between the node and the ground line;
  (e) control means for controlling the first and second Q-switch driver means and the flash lamp power supply to provide a control signal to the flash lamp power supply to fire the flash lamp, then providing a control signal to the first Q-switch driver means to cause it to provide an output pulse, and thereafter supplying a control signal to the second Q-switch driver means to cause it to provide an output pulse a selected period of time after the output pulse from the first Q-switch driver means.

8. The laser system of claim 7 wherein each Q-switch driver means includes a capacitor which is charged by the high voltage from the respective high voltage power supply, and a switch connected across the capacitor which is triggered by the control means to discharge the capacitor, and wherein the interface circuit further includes a diode connected between the output of the first Q-switch driver means and the ground line and a diode connected between the output of the second Q-switch driver means and the ground line, whereby the capacitor in each Q-switch driver means may be charged by a current flowing through the capacitor and through the diode connected to such capacitor to the ground line, and whereby when the capacitor is discharged the diode connected to the ground line is back biased so that current from the capacitor flows to the output of the interface circuit.

9. A Q-switched laser system comprising:
(a) a laser light source including a laser rod, flash lamp, flash lamp power supply, and a Q-switch including an electro-optical cell for controlling the release of light from the laser in response to a voltage signal;
(b) first Q-switch driver means for producing an output voltage pulse in response to a control signal for operating the electro-optical cell of the Q-switch, and a high voltage power supply for providing a high voltage to the first Q-switch driver means;
(c) second Q-switch driver means for providing an output voltage pulse in response to a control signal for operating the electro-optical cell of the Q-switch, and a second high voltage power supply providing a high voltage to the second Q-switch driver means wherein each Q-switch driver means includes an avalanche switch comprising a plurality of transistors connected in an avalanche configuration, and wherein the control signal is provided to a first of the transistors which conducts to drive each of the other transistors in the avalanche switch into conduction;
(d) an interface circuit connected to receive the outputs of the first and second Q-switch driver means and connected to provide its output to the electro-optical cell, the interface circuit including means for passing an output voltage pulse from either one of the Q-switch driver means to its output while isolating the other Q-switch driver means from the voltage provided to the electro-optical cell;
(e) control means for controlling the first and second Q-switch driver means and the flash lamp power supply to provide a control signal to the flash lamp power supply to fire the flash lamp, then providing a control signal to the first Q-switch driver means to cause it to provide an output pulse, and thereafter supplying a control signal to the second Q-switch driver means to cause it to provide an output pulse a selected period of time after the output pulse from the first Q-switch driver means;
wherein each Q-switch driver means further includes a capacitor connected across the avalanche switch and connected through a resistor to receive the high voltage from the high voltage power supply to which the Q-switch driver means is connected, such that the capacitor is charged up to the voltage level of the high voltage supply when the avalanche switch is open, and wherein the capacitor is also connected to the interface circuit such that when the avalanche switch is turned on and closed to provide a short circuit therethrough, the capacitor discharges through the avalanche switch and provides a negative pulse through the interface circuit to the electro-optical cell.

10. The laser system of claim 9 wherein the means for isolating in the interface circuit includes two diodes connected in back-to-back relation at a node, the node connected by a resistor to a ground line, one diode also connected to the output of the first Q-switch driver means and the other diode connected to the output of the second Q-switch driver means, and wherein the output of the interface circuit to the electro-optical cell is provided across the resistor connected between the node and the ground line, the interface circuit further including a diode connected between the output of the first Q-switch driver means and the ground line and a diode connected between the output of the second Q-switch driver means and the ground line, whereby the capacitor in each Q-switch driver means may be charged by a current flowing through the capacitor and through the diode connected to such capacitor to the ground line, and whereby when the capacitor is discharged the diode connected to the ground line is back biased so that current from the capacitor flows to the output of the interface circuit.

11. A method of providing laser light pulses in rapid succession in a laser system including a laser rod, a flash lamp, and a Q-switch including an electro-optical cell for controlling the release of light from the laser rod in response to a voltage signal, comprising the steps of:
firing the flash lamp a single time to energize the laser rod;
providing a first Q-switch switching pulse to the electro-optical cell at a first voltage level to allow a laser light pulse to be released from the laser;
then, a selected period of time after the first pulse while the laser rod is still excited from the firing of the flash lamp, providing a second pulse to the electro-optical cell at a voltage level which is higher than the voltage level of the first pulse and which is selected such that the light output from the laser during the first and second pulses is substantially equal.

12. The method of claim 11 wherein the step of providing the second pulse to the electro-optical cell is carried out within a time period less than 60 microseconds from the time that the first pulse is provided to the electro-optical cell.

13. The method of claim 11 wherein the second pulse is provided to the electro-optical cell 2 to 5 microseconds after the first pulse is applied to the electro-optical cell.

14. An interface circuit for use with a Q-switched laser system having a laser light source with a Q-switch including an electro-optical cell for controlling the release of light from the laser in response to a voltage signal, first and second Q-switch drivers each producing an output voltage pulse by discharging a capacitor in response to a control signal and first and second high voltage power supplies providing high voltages to the first and second Q-switch drivers, respectively, the interface circuit connected to receive the outputs of the first and second Q-switch drivers and connected to provide its output to the electro-optical cell, the interface circuit comprising:
two diodes connected in back-to-back relation at a node, the node connected by a resistor to a ground line, one diode also connected to the output of the first Q-switch driver and the other diode connected to the output of the second Q-switch driver, and wherein the output of the interface circuit to the electro-optical cell is provided across the resistor connected between the node and the ground line, the interface circuit further including a diode connected between the output of the first Q-switch driver and the ground line and a diode connected between the output of the second Q-switch driver and the ground line, whereby the capacitor in each Q-switch driver may be charged by a current flowing through the capacitor and through the diode connected to such capacitor to the ground line, and whereby when the capacitor is discharged the diode connected to the ground line is back biased so that current from the capacitor flows to the output of the interface circuit.

* * * * *